United States Patent
Shin et al.

(10) Patent No.: US 6,206,578 B1
(45) Date of Patent: Mar. 27, 2001

(54) CONNECTION ASSEMBLY OF COMPUTER AND PORT REPLICATOR

(75) Inventors: Hyun-kuk Shin, Suwon; Il Kim, Yongin, both of (KR); Seong-sik Shin, Cupertino, CA (US)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/332,946

(22) Filed: Jun. 15, 1999

(30) Foreign Application Priority Data

Jun. 15, 1998 (KR) .................................................. 98-22431

(51) Int. Cl.$^7$ ...................................................... G02B 6/36
(52) U.S. Cl. ............................................... 385/54; 385/134
(58) Field of Search ................................. 385/53, 54, 76, 385/134

(56) References Cited

U.S. PATENT DOCUMENTS

| 4,653,845 | * | 3/1987 | Tremblay et al. ................ 350/96.16 |
| 5,394,503 | * | 2/1995 | Dietz, Jr. et al. ..................... 385/134 |

FOREIGN PATENT DOCUMENTS

| 62-6709 | 1/1987 | (JP) | .................................. G02B/6/40 |
| 4-342005 | 11/1992 | (JP) | .................................. G06F/3/00 |
| 9-18423 | 1/1993 | (JP) | ................................ H04B/10/28 |
| 5-341890 | 12/1993 | (JP) | .................................. G06F/3/00 |
| 6-19580 | 1/1994 | (JP) | .................................. G06F/1/16 |
| 6-28072 | 2/1994 | (JP) | .................................. G06F/3/00 |
| 7-281801 | 10/1995 | (JP) | .................................. G06F/3/00 |
| 9-5580 | 1/1997 | (JP) | .................................. G02B/6/42 |
| 9-237942 | 9/1997 | (JP) | .................................. H01S/3/18 |

* cited by examiner

Primary Examiner—Hung N. Ngo
(74) Attorney, Agent, or Firm—Sughrue, Mion, Zinn, Macpeak & Seas, PLLC

(57) ABSTRACT

A connection assembly of a computer and a port replicator for distributing a plurality of signals generated from the computer to each of a plurality of peripheral devices. The connection assembly includes a first optical connecter installed at the computer for transmitting input signals using light, a second optical connecter installed at the port replicator to correspond to the first optical connecter for transmitting input signals using light, and a portion for coupling the first and second optical connecters to communicate with each other. Thus, since the first and second light-receiving/emitting units are disposed to be separated a predetermined distance from each other and exchange information signals, the reliability with respect to connection can be maintained when the port replicator is repeatedly connected and disconnected to and from the computer. Also, EMI can be reduced by replacing the pin and pin holder with the first and second light-receiving/emitting units. Further, the replacement of the pin and pin holder with the optical connecter, which is smaller in volume and lighter, makes the entire connection assembly lightweight.

8 Claims, 5 Drawing Sheets

CONNECTION ASSEMBLY OF COMPUTER AND PORT REPLICATOR

BACKGROUND OF THE INVENTION

1. Field of the Invention

The present invention relates to a connection assembly of a computer and a port replicator through which signals can be transmitted using light.

2. Description of the Related Art

Referring to FIGS. 1 and 2, a notebook computer 10 has a plurality of ports 11 at the rear side thereof for connecting external peripheral devices such as a monitor, a printer, a mouse, a keyboard, and an external hard disk drive. Also, card slots for connecting PCMCIA cards are provided inside the notebook computer 10. The notebook computer 10 is usually used at different places, for example, at home and at office. Accordingly, whenever connection to a LAN, a printer, or a keyboard is required, the corresponding external peripheral devices are inconveniently connected to the ports 11.

A port replicator 20, connected to a portable computer such as a notebook computer, receives signals of multiple channels generated from the notebook computer and distributes the signals to each of the peripheral devices. The port replicator 20 has been developed to compensate for the above disadvantage of the portable computer. The port replicator 20 has a connector 25 connected to the notebook computer 10 for transmitting signals, and a plurality of ports 21 connected to the peripheral devices.

To connect the notebook computer 10 and the port replicator 20 by means of a mechanical connection, a conventional connection assembly of a computer and a replicator includes first and second connectors 15 and 25 installed at the computer 10 and the port replicator 20, respectively, and a coupling means 30 installed at the rear surface of the port replicator 20 for coupling the port replicator 20 to the notebook computer 10.

The coupling means 30 includes a groove 31 formed at the rear surface of the notebook computer 10 and a hook member 33 installed on the replicator 20 at a position corresponding to the groove 31 for pivoting. Accordingly, by positioning the port replicator 20 to the rear of the notebook computer 10 and pivoting the hook member 33, the hook member 33 is coupled to the groove 31 so that the port replicator 20 can be locked to the notebook computer 10.

The first connector 15 has pins of about 240 units for transmission of signals output from a PCI bus, a video port, a print port, a mouse, and a COM port. The second connector 25 has a number of pin holders that corresponds to the number of pins of the first connector 15 so that each of the pins of the first connector 15 can be connected to the corresponding pin holder of the second connector 25. Here, the pins and pin holders are formed of a metal such as copper (Cu) exhibiting superior electrical conductivity. Therefore, repeated connections and disconnections between the first and second connectors 15 and 25 may damage the pins and the pin holders and cause a connection defect therebetween, thus lowering the reliability and shortening the life span of products. Furthermore, the transmission of signals, such as electrical signals, has been an obstacle to reduction of electromagnetic interference (EMI).

SUMMARY OF THE INVENTION

To solve the above problems, it is an objective of the present invention to provide a connection assembly of a computer and a port replicator in which signals between the computer and the port replicator can be transmitted using light by a non-contact method.

Accordingly, to achieve the above objective, there is provided a connection assembly of a computer and a port replicator which distributes a plurality of signals generated from the computer to each of a plurality of peripheral devices which comprises a first optical connecter installed at the computer for transmitting input signals using light; a second optical connecter installed at the port replicator to correspond to the first optical connecter for transmitting input signals using light; and means for coupling the first and second optical connecters to communicate with each other.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
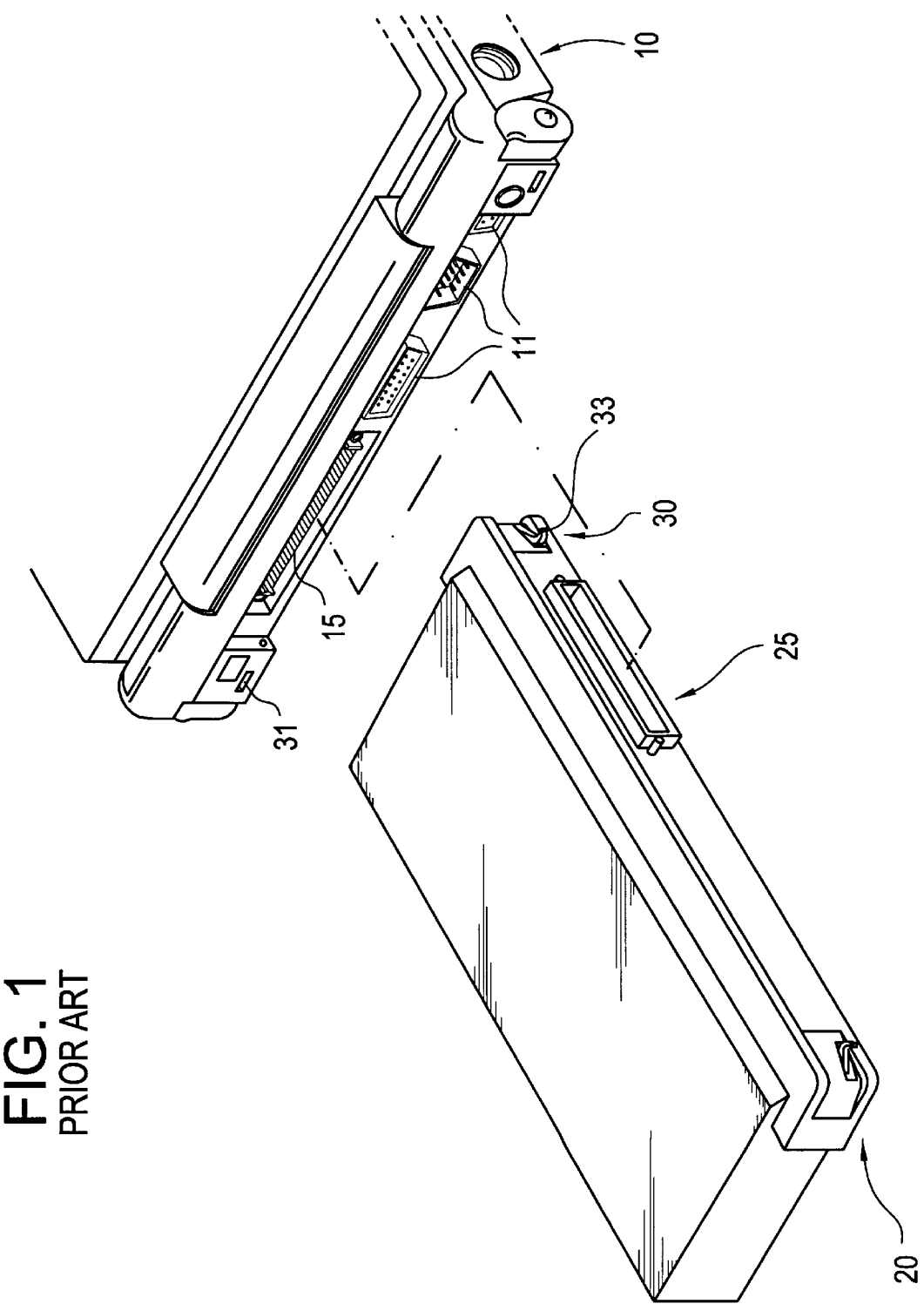
FIG. 1 is a perspective view showing a conventional connection assembly of a computer and a port replicator.
Figure 2:
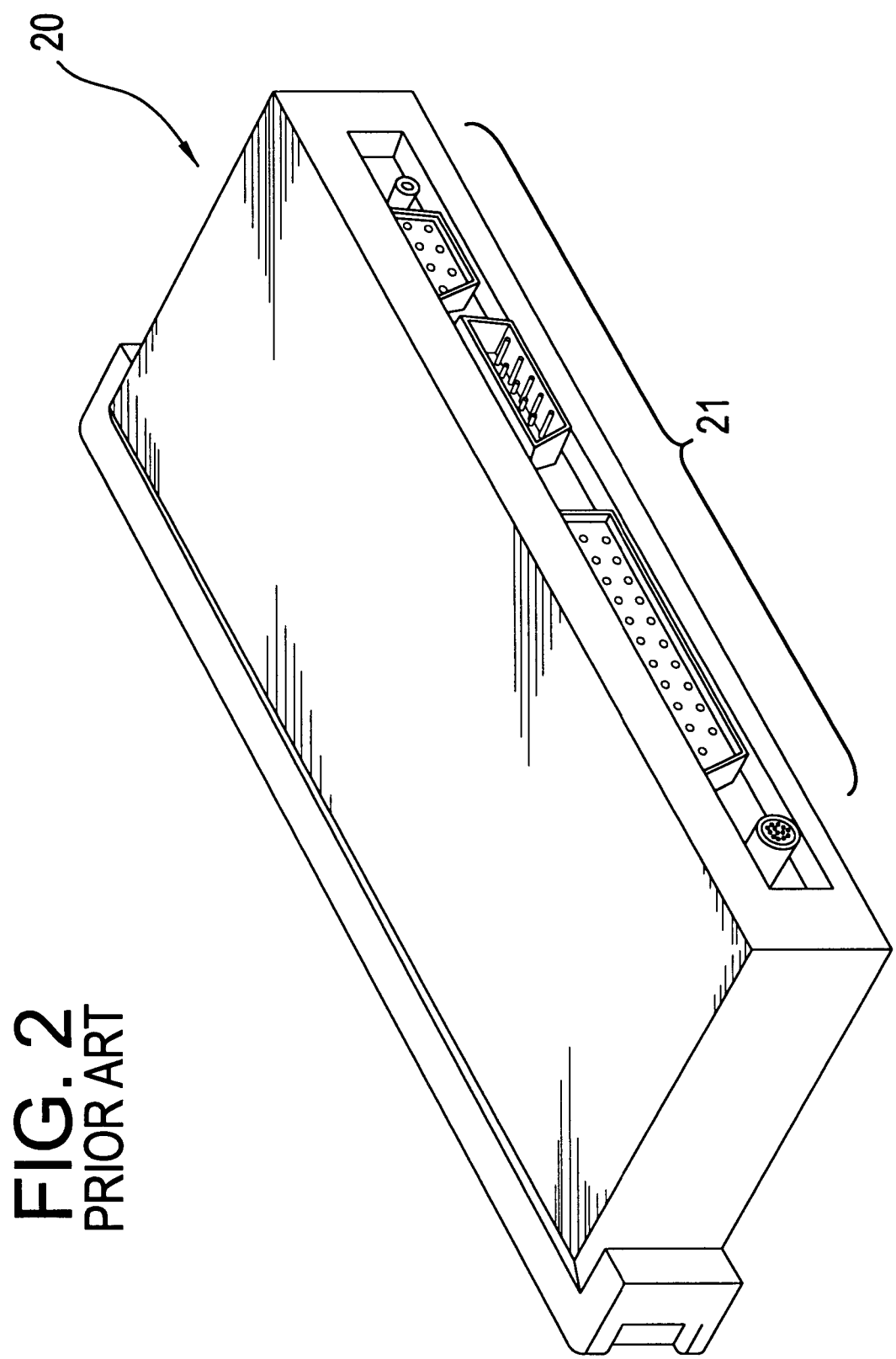
FIG. 2 is a perspective view showing the rear side of the port replicator shown in FIG. 1.
Figure 3:
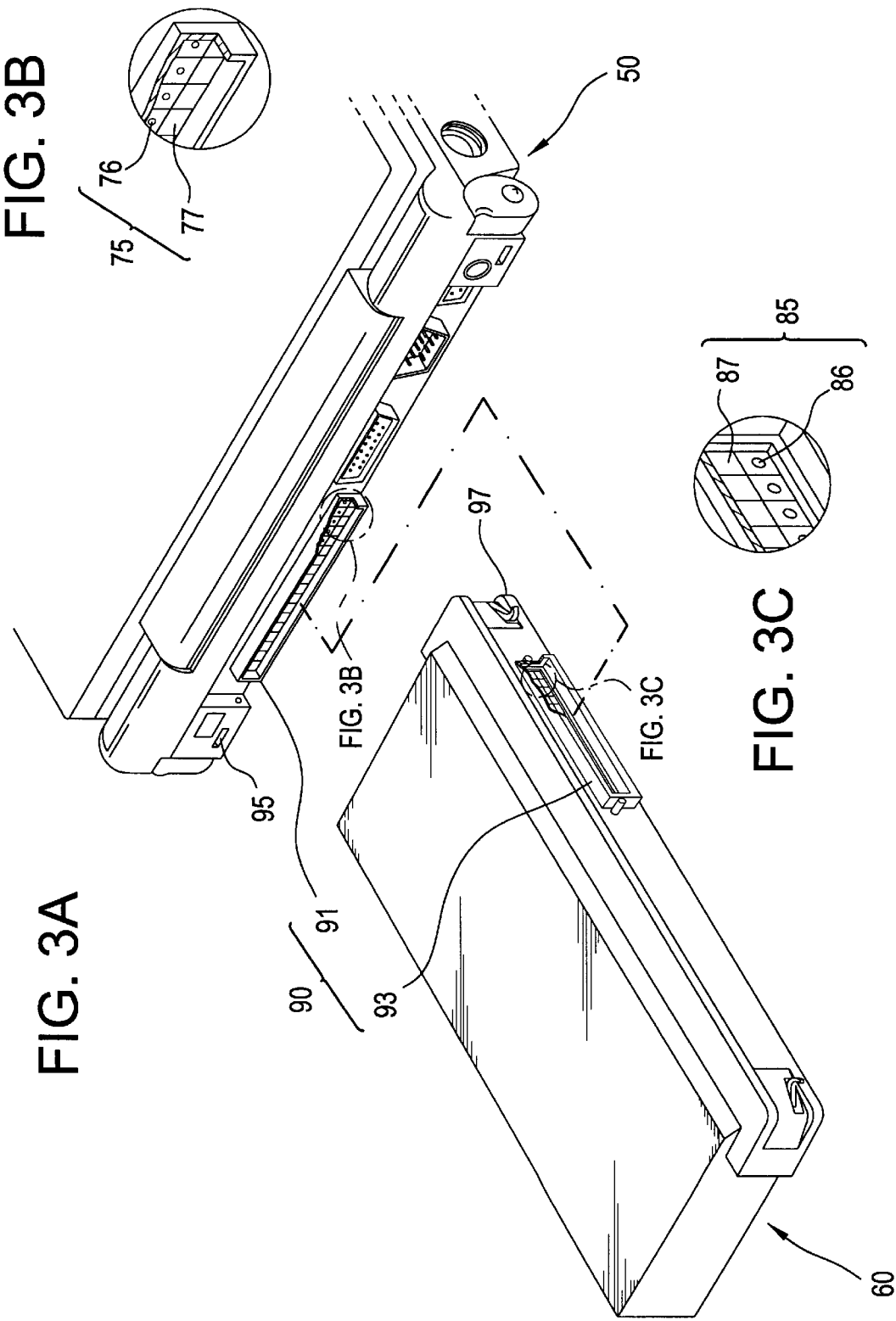
FIGS. 3A–3C are perspective views showing a connection assembly of a computer and a port replicator according to a preferred embodiment of the present invention.

FIG. 3 shows a connection assembly of a computer and a port replicator according to a preferred embodiment of the present invention. A port replicator 60 is for distributing a plurality of signals generated from a computer 50 to each of a plurality of peripheral devices. As shown in the drawing, the connection assembly includes an optical connecter and a coupling means 90 for coupling the optical connecter to combine the port replicator 60 to the computer 50.

Figure 4:
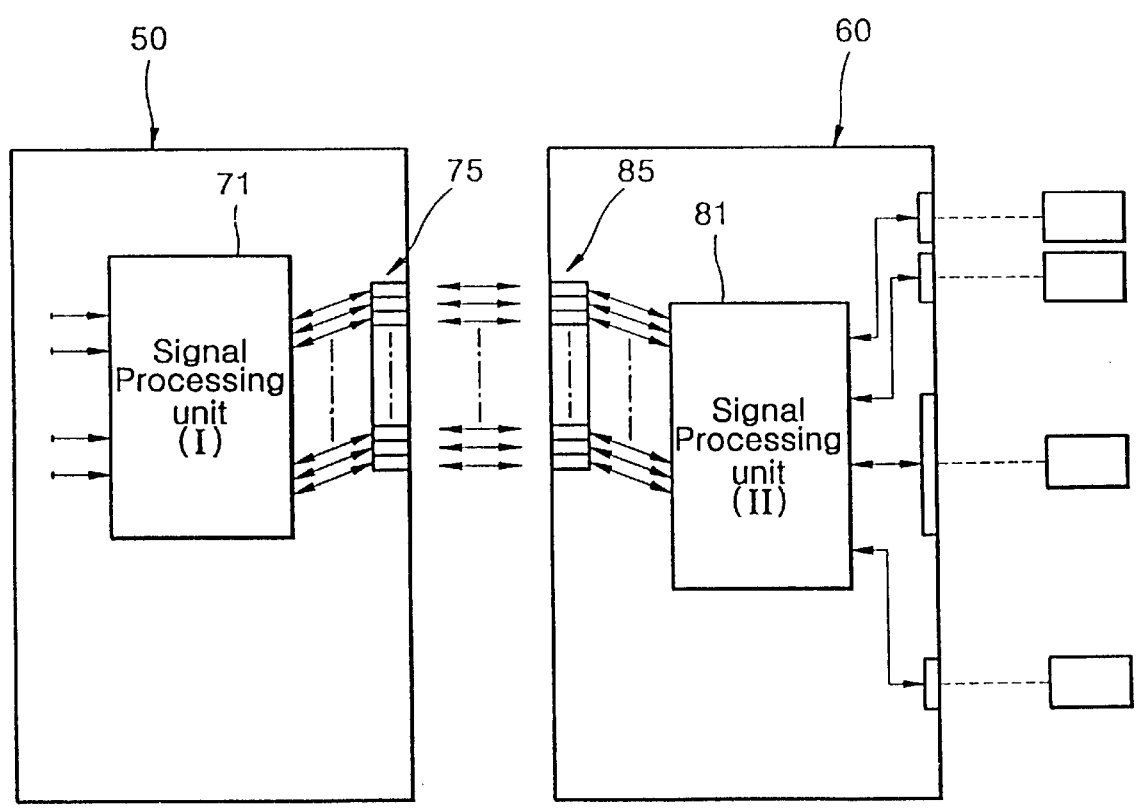
FIG. 4 is a block diagram of a signal transmission between the computer and the port replicator shown in FIGS. 3A–3C.

The optical connecter is installed at both the computer 50 and the port replicator 60 to communicate with each other and transmits signals using light. As shown in FIG. 4, the optical connecter is comprised of first and second signal processing units 71 and 81, and first and second light-receiving/emitting units 75 and 85.

The first signal processing unit 71 is installed inside the computer 50 for processing input information signals and driving signals. That is, the first signal processing unit 71 converts the information signals transmitted via a data bus in the computer 50 to the driving signals needed for operation of the first light-receiving/emitting units 75. Additionally, the processing unit 71 converts the signals input from the first light-receiving/emitting unit 75 to the information signals to transmit the converted signals to each element of the computer 50. The first light-receiving/emitting unit 75 includes a first light-emitting array 76 for selectively emitting light according to the driving signals output from the first signal processing unit 71, and a first light-receiving array 77 for receiving light transmitted from the port replicator 60 and performing photoelectric conversion on the received light.

The second signal processing unit 81 is installed in the port replicator 60 and processes input information signals and driving signals. The second light-receiving/emitting unit 85 is comprised of a second light-emitting array 86 for selectively emitting light toward the first light-receiving array 77 according to driving signals output from the second signal processing unit 81, and the second light-receiving array 87 for receiving light emitted from the first light-emitting array 76 and performing a photoelectric conversion on the received light.

Preferably, the first and/or second light-receiving/emitting units 75 and 85 are vertical cavity surface emitting laser arrays emitting light in the direction that a semiconductor matter layer is stacked. In this case, the first and second light-emitting arrays 76 and 86 each can be easily arrayed on a single substrate. Here, the first and second light-receiving/emitting units 75 and 85 are coupled by the coupling means 90 to face each other. That is, the first light-emitting array 76 is disposed to face the second light-receiving array 87 and the second lightemitting array 86 is disposed to face the first light-receiving array 77.

The coupling means 90 includes a first holder 91 formed at the rear surface of the computer 50 and having the first light-receiving/emitting unit 75 installed therein, and a second holder 93 formed at one side of the port replicator 60 and having the second light-receiving/emitting unit 85 installed therein. Thus, the first and second holders 91 and 93 are coupled to one another so that the first and second light-receiving/emitting units 75 and 85 are installed to be separated a predetermined distance from each other and to face each other. Preferably, the coupling means 90 further includes a groove 95 formed at the rear surface of the computer 50, and a hook member 97 installed at a position on the port replicator 60 corresponding to the position of the groove 95 of the computer 50 to be capable of pivoting.

Figure 5:
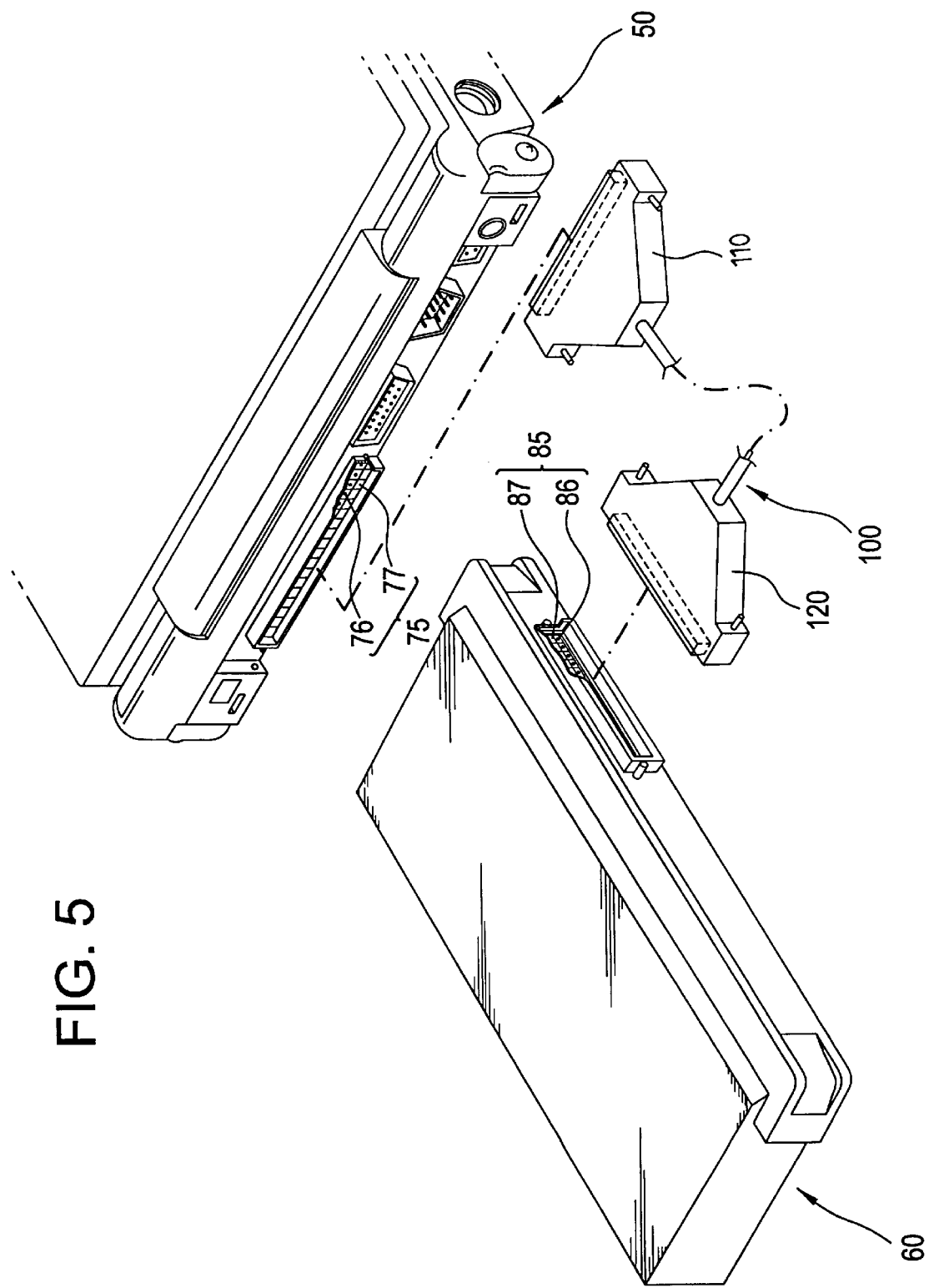
FIG. 5 is a perspective view showing a connection assembly of a computer and a port replicator according to another preferred embodiment of the present invention.

FIG. 5 shows a connection assembly of a computer and a port replicator according to another preferred embodiment of the present invention. Here, the elements having the same reference numerals as in FIGS. 3 and 4 have the same functions. As shown in these drawings, the connection assembly is comprised of an optical connecter and a coupling means 90 for coupling the optical connecter.

A description of the optical connecter which is the same as that shown in FIGS. 3 and 4 is omitted. The characteristic feature of the present preferred embodiment is the use of an optical fiber bundle 100 as the coupling means 90. That is, the coupling means 90 according to the preferred embodiment is comprised of an optical fiber bundle 100, and first and second couplers 110 and 120 for respectively connecting both ends of the optical fiber bundle 100 to the optical connecter.

Both ends of the optical fiber bundle 100 are installed to face the first and second light-receiving/emitting units 75 and 85. The light emitted from each of the first and second light-emitting arrays 76 and 86 is transmitted to the second light-receiving array 87 and the first light-receiving array 77, respectively. The first coupler 110 couples one end of the optical fiber bundle 100 to face the first light-receiving/emitting unit 75 and the second coupler 120 couples the other end of the optical fiber bundle 100 to face the second light-receiving/emitting unit 85. Here, since the structures of the first and second couplers 110 and 120 are the same as or similar to those of the first and second holders (91 and 93 of FIG. 3), descriptions of the first and second couplers 110 and 120 are omitted. Preferably, the optical fiber bundle 100 is formed of optical plastic. When the computer 50 and the port replicator 60 are connected using the optical fiber bundle, the computer 50 and the port replicator 60 can be freely and separately arranged so that limitations on installation space can be removed.

As described above, in the connection assembly according to the present invention, since the first and second light-receiving/emitting units are disposed to be separated a predetermined distance from each other and exchange information signals, when the port replicator is repeatedly connected and disconnected to and from the computer, reliability with respect to connection can be maintained. Also, EMI can be reduced by replacing the pin and pin holder with the first and second light-receiving/emitting units. Further, the replacement of the pin and pin holder with the optical connecter, which is smaller in volume and lighter in weight, makes the entire connection assembly lightweight.

Having described the invention in detail and by reference to the drawings, it will be apparent that modification and variations are possible without departing from the scope of the invention. Therefore, it is intended that the invention not be limited by the precise structure shown and described, but rather the full scope of the invention as defined in the following claims.

What is claimed is:

1. A connection assembly of a computer and a port replicator which distributes a plurality of signals generated from said computer to each of a plurality of peripheral devices, said connection assembly comprising:
   a first optical connecter installed at said computer for transmitting input signals using light;
   a second optical connecter installed at said port replicator to correspond to said first optical connecter for transmitting input signals using light; and
   means for coupling said first and second optical connecters to communicate with each other.

2. The connection assembly as claimed in claim 1, wherein said means for coupling comprises:
   a first holder formed at a rear surface of said computer and having a first light-receiving/emitting unit installed therein; and
   a second holder formed at one surface of said port replicator and having a second light-receiving/emitting unit installed therein, wherein said first and second holders are coupled to each other so that said first and second light-receiving/emitting units are installed to face each other and to be separated a predetermined distance from each other.

3. The connection assembly as claimed in claim 1, wherein said means for coupling comprises:
   an optical fiber bundle having each end thereof installed to face said first and second light-receiving/emitting units and transmitting light emitted from said first and second light-emitting arrays to said second and first light-receiving arrays, respectively;
   a first coupler which couples one end of said optical fiber bundle to face said first light-receiving/emitting unit; and
   a second coupler which couples the other end of said optical fiber bundle to face said second light-receiving/emitting unit.

4. The connection assembly as claimed in claim 1, wherein said first optical connecter comprises:
   a first signal processing unit for processing input information signals and driving signals; and
   a first light-receiving/emitting unit including a first light-emitting array for selectively emitting light according to the driving signals output from said first signal processing unit, and a first light-receiving array for receiving the light transmitted from said port replicator and performing photoelectric conversion.

5. The connection assembly as claimed in claim 1, wherein said second optical connecter comprises:
- a second signal processing unit installed in said port replicator for processing input information signals and driving signals; and
- a second light-receiving/emitting unit including a second light-emitting array for selectively emitting light toward said first light-receiving array according to the driving signals output from said second signal processing unit, and a second light-receiving array for receiving the light emitted from said first light-emitting array and performing photoelectric conversion.

6. The connection assembly as claimed in claim 4, wherein said first and or second light-emitting array are vertical cavity surface emitting laser arrays.

7. The connection assembly as claimed in claim 4, wherein said means for coupling comprises:
- a first holder formed at a rear surface of said computer and having said first light-receiving/emitting unit installed therein; and
- a second holder formed at one surface of said port replicator and having said second light-receiving/emitting unit installed therein, wherein said first and second holders are coupled to each other so that said first and second light-receiving/emitting units are installed to face each other and to be separated a predetermined distance from each other.

8. The connection assembly as claimed in claim 4, wherein said means for coupling comprises:
- an optical fiber bundle having each end thereof installed to face said first and second light-receiving/emitting units and transmitting each of lights emitted from said first and second light-emitting arrays to said second and first light-receiving arrays, respectively;
- a first coupler which couples one end of said optical fiber bundle to face said first light-receiving/emitting unit; and
- a second coupler which couples the other end of said optical fiber bundle to face said second light-receiving/emitting unit.

* * * * *